(12) United States Patent
Dabbiru et al.

(10) Patent No.: US 12,353,484 B2
(45) Date of Patent: Jul. 8, 2025

(54) SYSTEM AND METHOD FOR IMPROVING THE EFFICACY OF A DATA ELEMENT WITHIN A NEURAL NETWORK

(71) Applicant: BANK OF AMERICA CORPORATION, Charlotte, NC (US)

(72) Inventors: Ravindra Dabbiru, Telangana (IN); Venugopala Rao Randhi, Telangana (IN); Rama Venkata S. Kavali, Frisco, TX (US); Manohar Aedma, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/231,990

(22) Filed: Aug. 9, 2023

(65) Prior Publication Data
US 2025/0053600 A1 Feb. 13, 2025

(51) Int. Cl.
*G06F 16/951* (2019.01)
*G06F 16/2457* (2019.01)
*G06F 16/953* (2019.01)

(52) U.S. Cl.
CPC ...... *G06F 16/951* (2019.01); *G06F 16/24578* (2019.01); *G06F 16/953* (2019.01)

(58) Field of Classification Search
CPC . G06F 16/951; G06F 16/953; G06F 16/24578
See application file for complete search history.

(56) References Cited

U.S. PATENT DOCUMENTS

| 9,043,315 | B2* | 5/2015 | Gruschko | G06F 16/245 707/722 |
| 2012/0084291 | A1* | 4/2012 | Chung | G06F 16/14 707/E17.084 |
| 2012/0124073 | A1* | 5/2012 | Gross | H04L 65/61 707/767 |
| 2023/0395067 | A1* | 12/2023 | Perkins | G06F 16/316 |

OTHER PUBLICATIONS

Chongstitvatana et al. (Refining High-frequency-queries-based Filter for Similarity Join; 978-1-4673-7825-3/15/$31.00 © 2015 IEEE) (Year: 2015).*

* cited by examiner

*Primary Examiner* — Ken Hoang
(74) *Attorney, Agent, or Firm* — Moore & Van Allen PLLC; Gabrielle M. Carlini

(57) ABSTRACT

In conventional networked computing systems, each system may have many atomic values shared across multiple application servers. Each atomic value may require different levels of computational resources to store, maintain, and access, and may provide a different level of usefulness within the computing system. As such, a need exists for a system of improving the efficacy of each data element with a neural network or networked computing system. The system provided herein solves with problem by identifying each data element within a computing system; crawling multiple application servers to collect usage values for each data element; calculating a computational weightage of each data elements, identifying critical values; and creating hash values for each critical value.

17 Claims, 7 Drawing Sheets

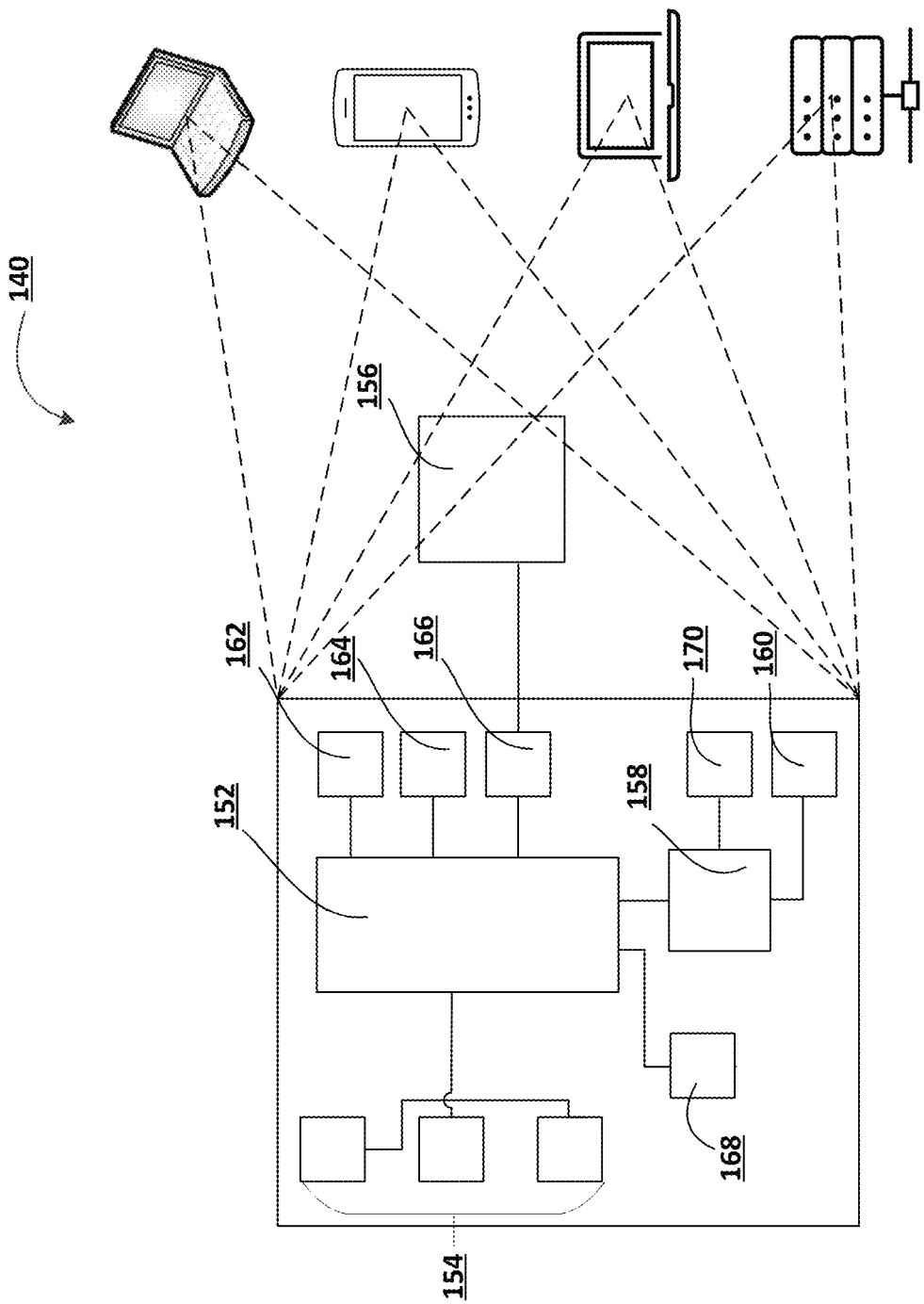

SYSTEM AND METHOD FOR IMPROVING THE EFFICACY OF A DATA ELEMENT WITHIN A NEURAL NETWORK

TECHNOLOGICAL FIELD

Example embodiments of the present disclosure relate to a system and method for improving the efficacy of a data element within a neural network.

BACKGROUND

In conventional networked computing systems, each system may have many atomic values shared across multiple application servers. Each atomic value may require different levels of computational resources to store, maintain, and access, and may provide a different level of usefulness within the computing system. As such, a need exists for a system of improving the efficacy of each data element with a neural network or networked computing system.

Applicant has identified a number of deficiencies and problems associated with conventional methods of analyzing and improving the efficacy of data elements within a network system. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for improving the efficacy of a data element within a neural network.

In one aspect, a system for improving the efficacy of a data element within a neural network is presented. The system may include at least one non-transitory storage device and at least one processor coupled to the at least one non-transitory storage device, where the processing device is configured to execute computer program code comprising computer instructions configured to cause said at least one processor to perform the following operations: generate a token associated with a first data query; crawl into a first application server of a plurality of application servers, where each application server includes application metadata; identify, within the application metadata of the first application server, a source value matching a token value; calculate a weight associated with the source value; and generate a hash value for the token.

In some embodiments, executing the instructions further causes the processing device to collect a plurality of data queries from a memory of the system, where the plurality of data queries includes the first data query.

In some embodiments, the application metadata includes at least one of: an application database, an application codebase, an application memory, and an application usage log.

In some embodiments, executing the instructions further causes the processing device to identify, using a natural language processing (NLP) engine, a match between the source value and the token value, where the NLP engine is configured to check for transformation logic between the source value and the token value.

In some embodiments, the weight associated with the source value is based on at least one of: a number of copies of the source value, a network consumption of the source value, a size associated with the source value, a number of modifications associated with the source value, and a complexity score associated with the source value.

In some embodiments, executing the instructions further causes the processing device to assign a rank to the token, where the rank is based on the weight associated with the source value.

In some embodiments, executing the instructions further causes the processing device to calculate a usage score associated with the token; and based on the usage score, collect a second plurality of data queries from the memory of the system.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
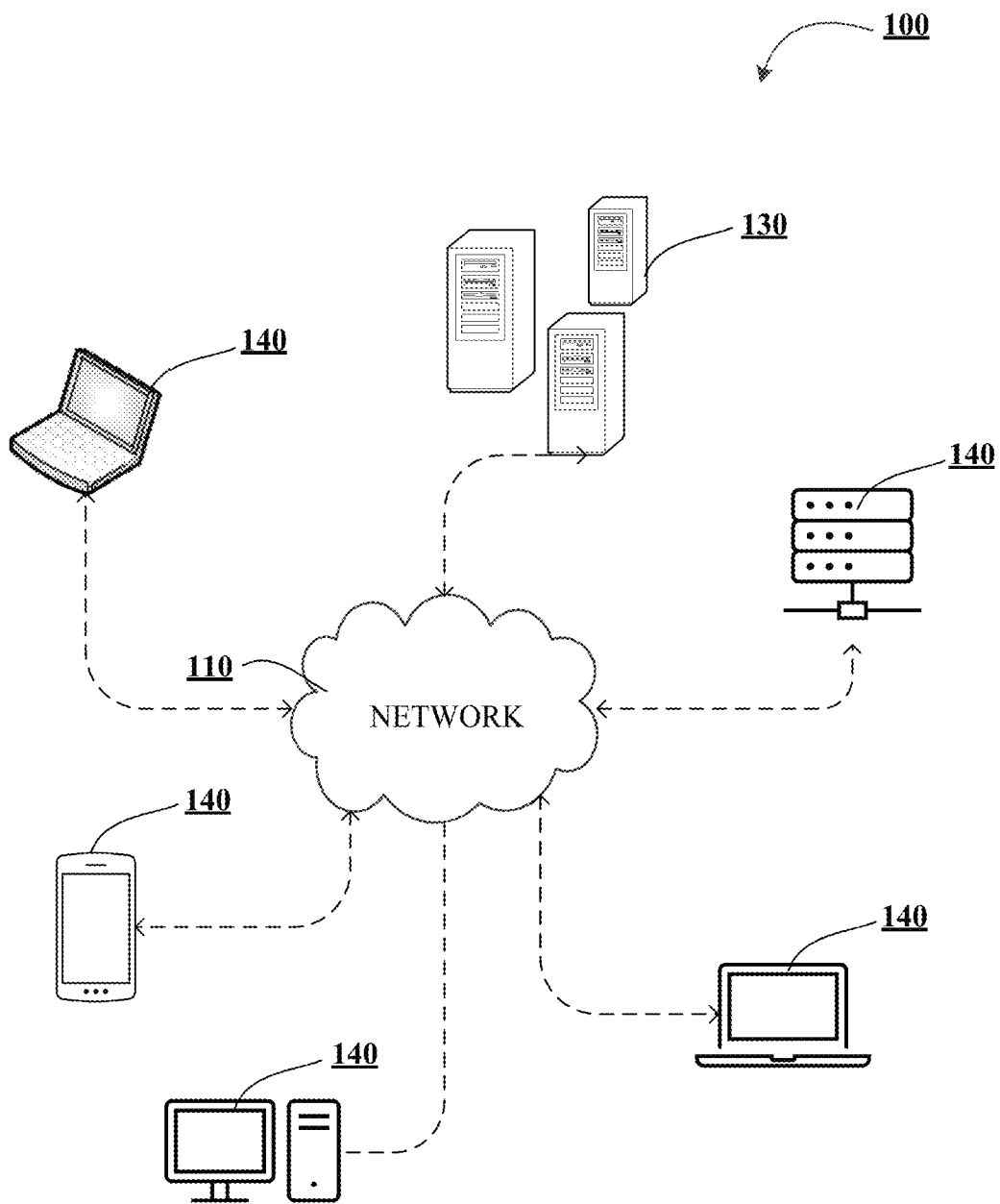
Figure 1B:
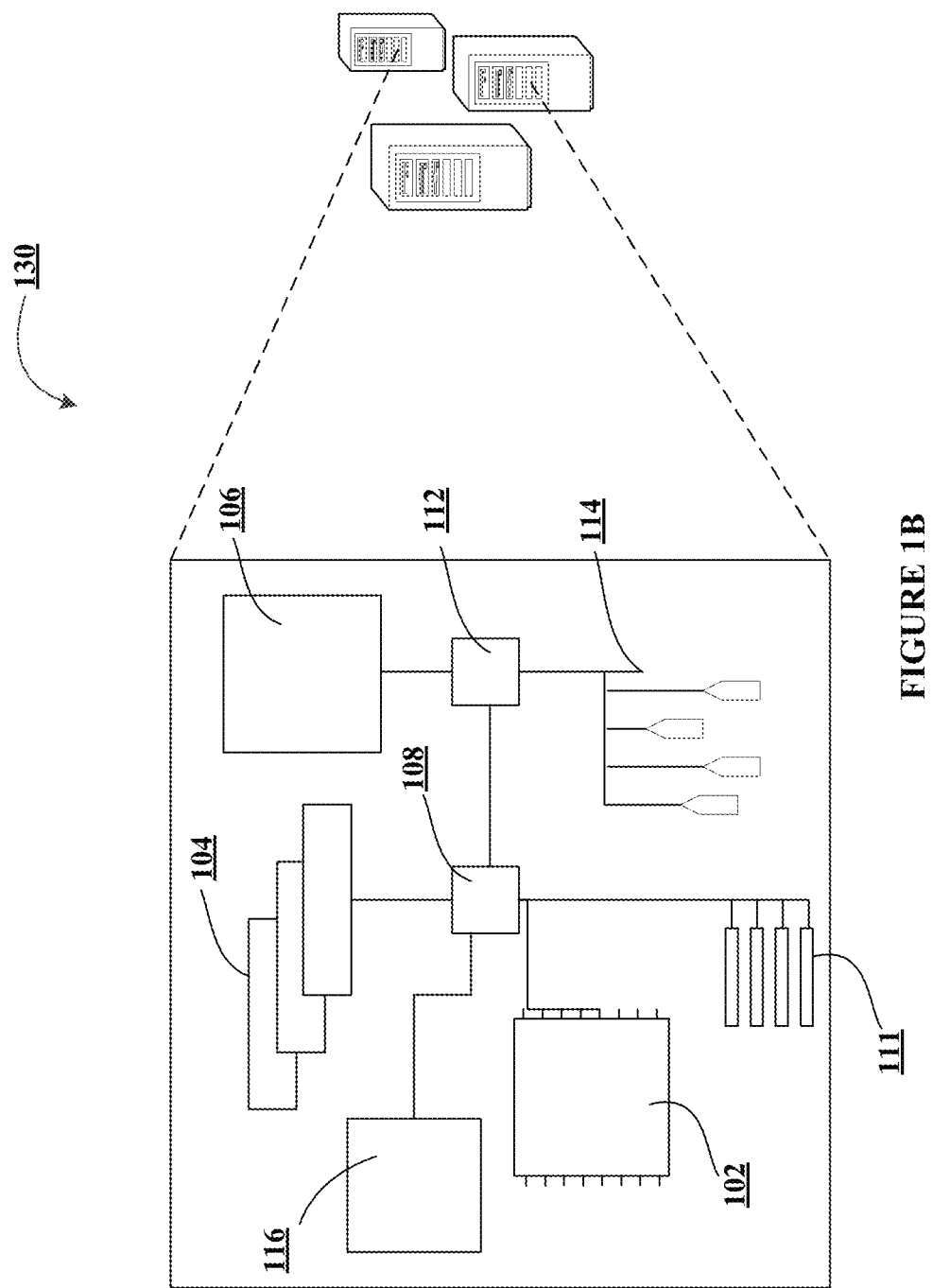
Figure 2A:
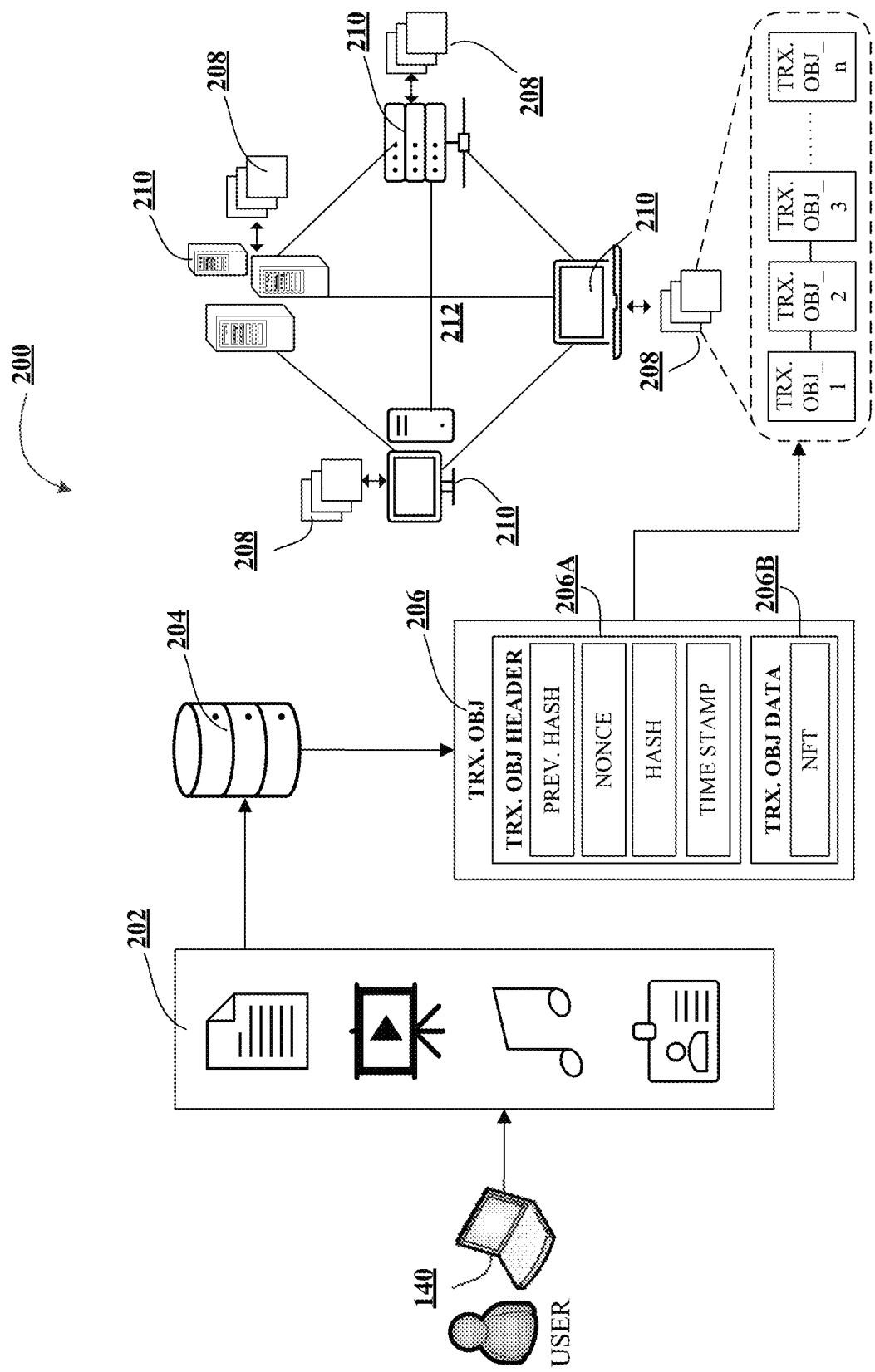
Figure 2B:
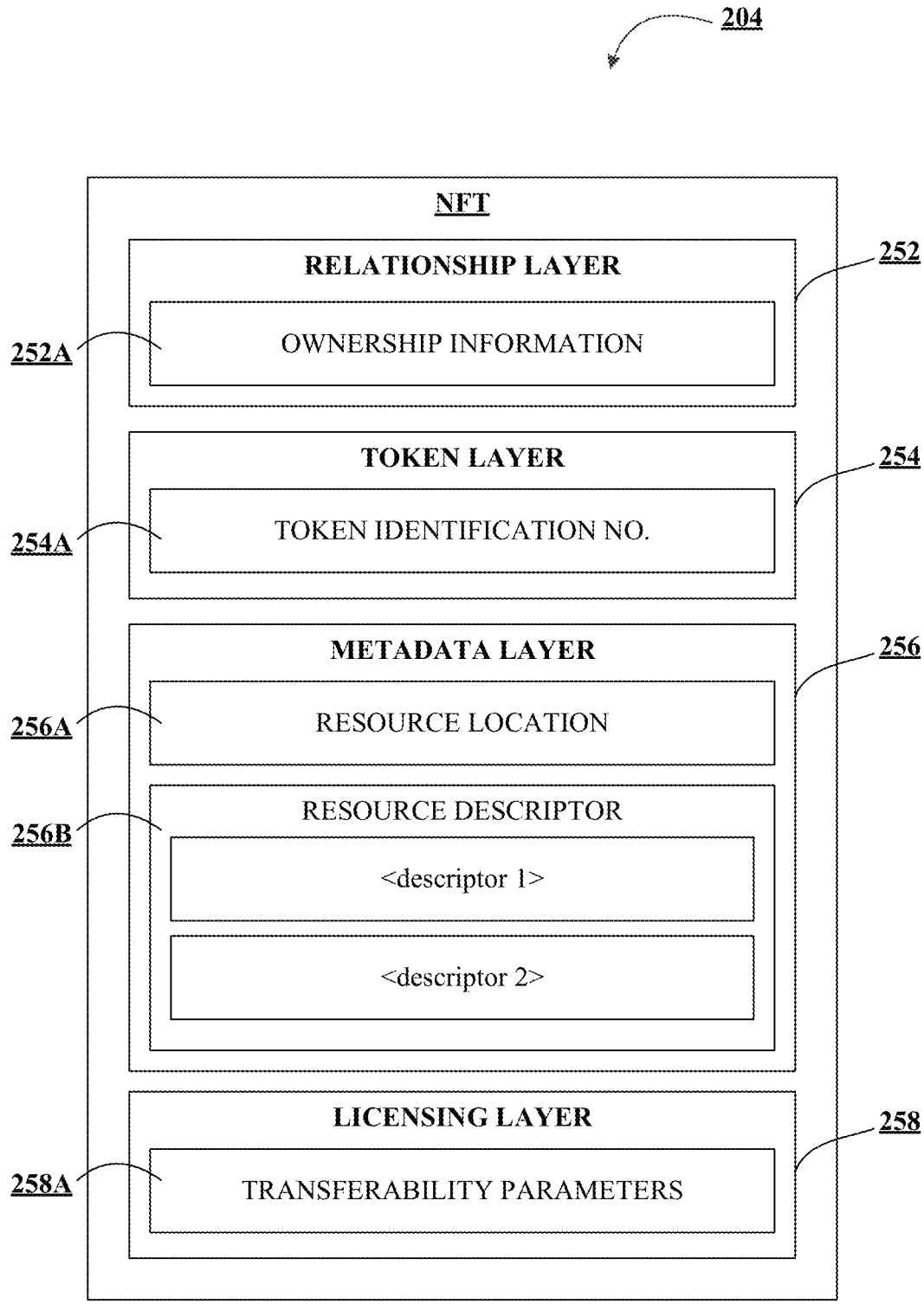
Figure 3:
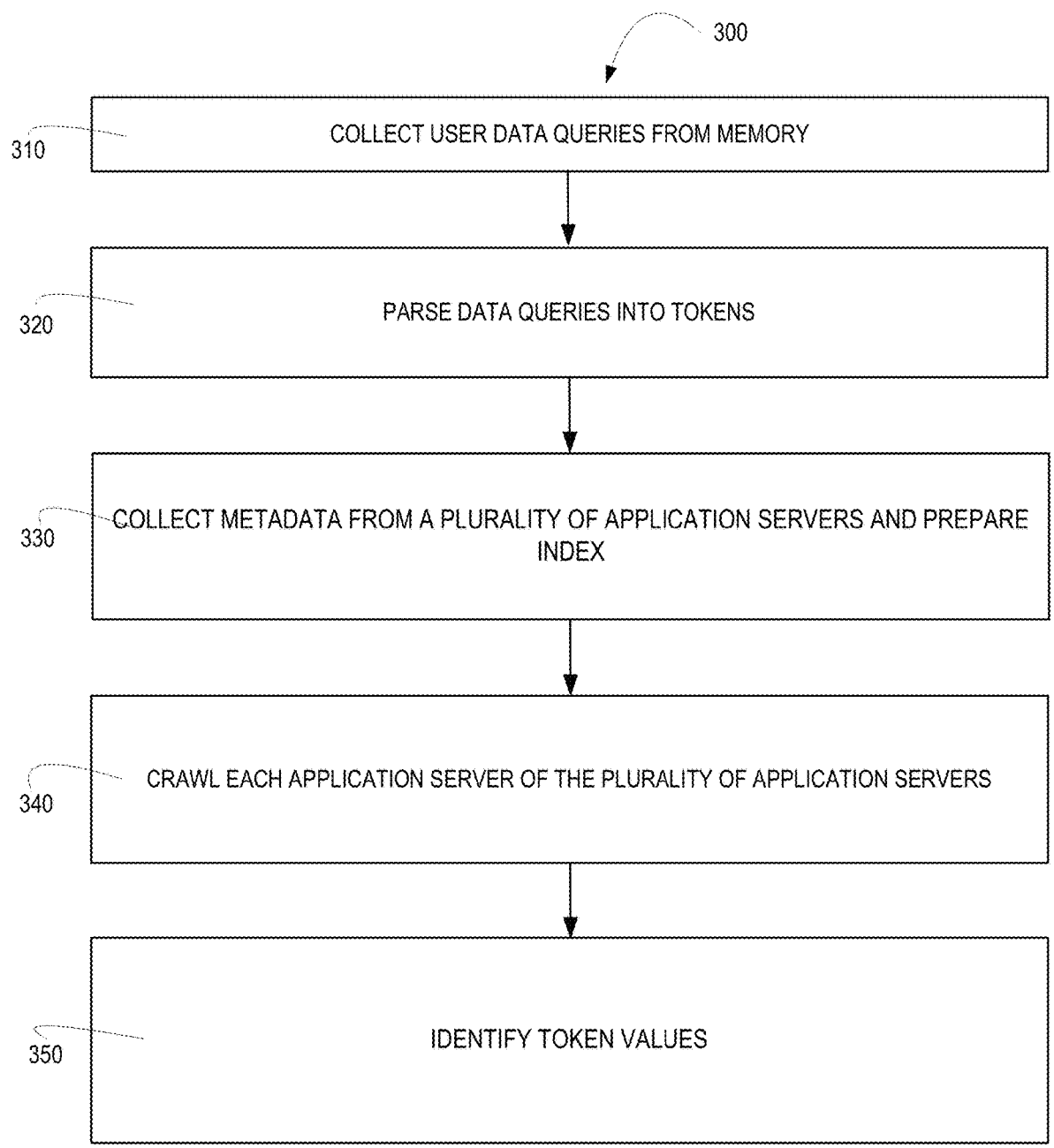
Figure 4:
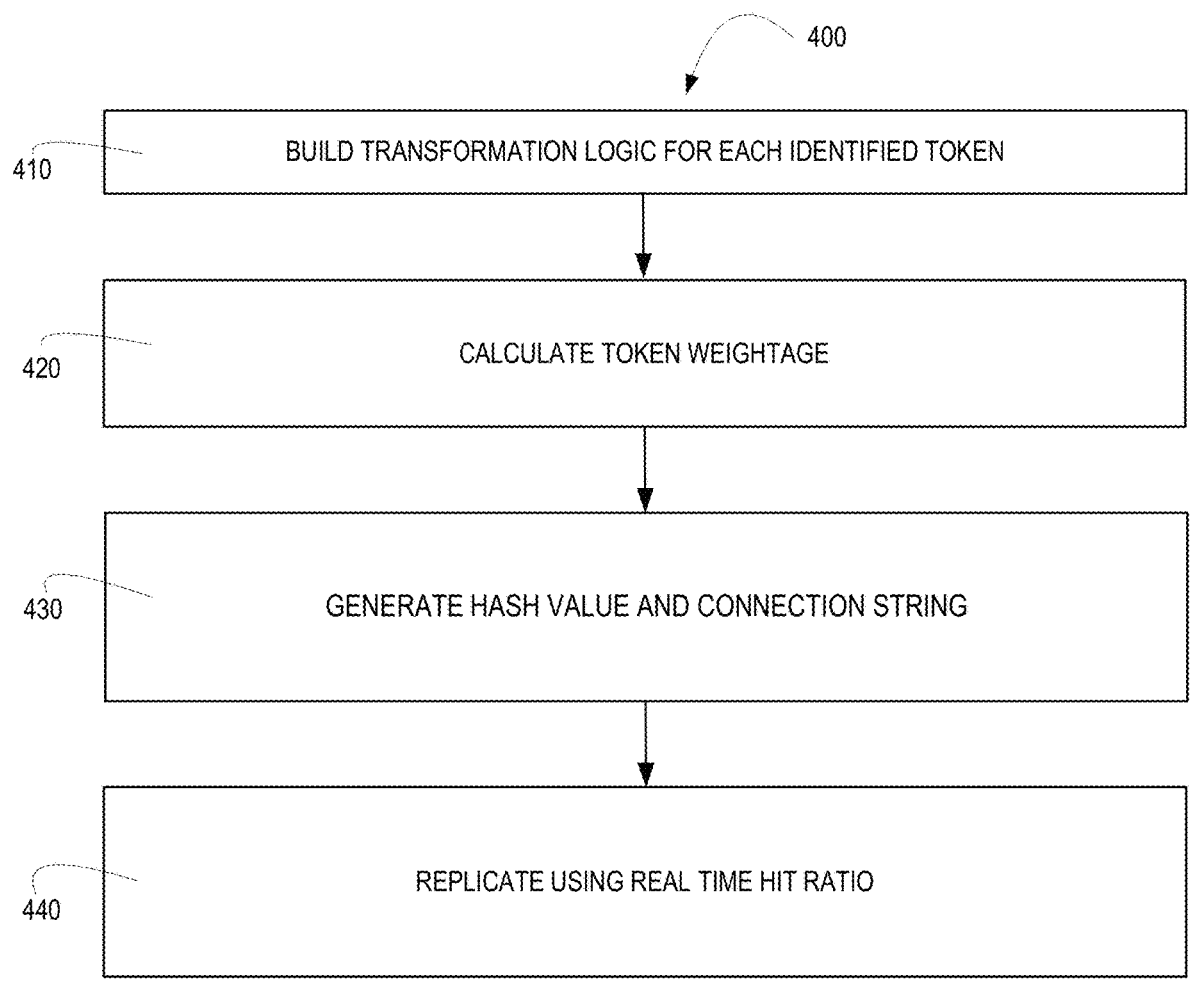

FIGS. 1A-1C illustrates technical components of an exemplary distributed computing environment for improving the efficacy of a data element, in accordance with an embodiment of the disclosure;

FIG. 2A illustrates an exemplary process of creating an NFT, in accordance with an embodiment of the invention;

FIG. 2B illustrates an exemplary NFT, in accordance with an embodiment of an invention;

FIG. 3 illustrates a process flow for improving the efficacy of a data element, in accordance with an embodiment of the disclosure; and FIG. 4 illustrates a process flow for improving the efficacy of a data element, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In conventional networked computing systems, each system may have many atomic values shared across multiple application servers. Each atomic value may require different levels of computational resources to store, maintain, and access, and may provide a different level of usefulness within the computing system. As such, a need exists for a system of improving the efficacy of each data element with a neural network or networked computing system. The system provided herein solves with problem by identifying each data element within a computing system; crawling multiple application servers to collect usage values for each data element; calculating a computational weightage of each data elements, identifying critical values; and creating hash values for each critical value.

What is more, the present disclosure provides a technical solution to a technical problem. As described herein, the technical problem includes a tradeoff between the need to store, maintain, and access critical data elements within a computing system and the computational resources required to store and maintain said data elements. The technical solution presented herein allows for unique hash values and connections strings to be generated for the most critical data elements in a computing system, thereby reducing the computational resources to maintain said elements in multiple locations within the system. In particular, the claimed system reduces the amount of computing resources, such as processing resources, storage resources, network resources, and/or the like, that are being used, removes manual input and waste from the implementation of the solution, thus improving speed and efficiency of the process and conserving computing resources, and reduces network traffic and load on existing computing resources. Furthermore, the technical solution described herein uses a rigorous, computerized process to perform specific tasks and/or activities that were not previously performed.

FIGS. 1A-1C illustrate technical components of an exemplary distributed computing environment 100 for improving the efficacy of a data element in a network, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from digital objects that represent both tangible and intangible objects. These resources 202 may include one or more data elements, values, files, database objects, variables, and/or the like. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce-a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller S1, the relationship between B1 and S1 as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descriptor 256B may include specific information associated with the source itself 202. For example, the file descriptor 256B may include information about the supply, authenticity, lineage, provenance of the resource 202. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates a process flow 300 for improving the efficacy of a data element, in accordance with an embodiment of the disclosure. The process flow may begin at block 310, where the system may be configured to collect a plurality of user data queries or user requests from a memory of the system. The data queries or data requests may be associated with particular data elements or values located within the system, and may be gathered from the memories of one or more applications running within the system. For example, the system may collect a plurality of data queries from a cybersecurity application, where each data query may be a request for all incident files associated with a particular time span.

The process flow may then continue to block 320, where the system may parse the collected data queries into individual tokens, wherein each token comprises a token value. In some embodiments, the system may parse the data queries using a natural language processing (NLP) engine in order to convert the language of the data queries into a standard format. In some embodiments, the system may then group the individual tokens based on one or more predetermined factors such as predicate values, attributes of the tokens, and/or the like. Additionally or alternatively, the system may group the individual tokens into one or more token tables, each comprising a plurality of tokens.

The process flow may then continue to block 330, where the system may collect metadata from a plurality of application servers, wherein each application server is located within or is in operative communication with the network. The metadata may include, in some embodiments, an application database, an application codebase, an application memory, an application usage log, and/or the like. In some embodiments, the system may be configured to prepare an index or other data structure for each application server, wherein each index categorizes and stores the application metadata.

The process flow may then continue to block 340, where the system may crawl each application server and/or the collected metadata from each application server. During the crawling process, the system may collect source values such as application schema, entity details, application attributes, relationships between data elements, and/or the like. As the system crawls each application server, the system may be configured to search for one or more of the individual token values. The process flow may then continue to block 350, where the system may identify a source value matching a token value. In some embodiments, where the source value and token value may not be an exact match, the system may use the NLP engine to determine that a match exists between the source value and the token value. Specifically, the NLP engine may be configured to check for transformation logic between the source value and the token value.

FIG. 4 illustrates a process flow 400 for improving the efficacy of a data element, in accordance with an embodiment of the disclosure. The process flow may begin at block 410, where the system may be configured to build transformation logic for each token value with an identified matching source value. Next, the process flow may continue to block 420, where the system may calculate a token weightage. In some embodiments, the system may calculate a weight associated with the source value, where the weight is based on at least one of: a number of copies of the source value, a network consumption of the source value, a size associated with the source value, a number of modifications associated with the source value, a complexity score associated with the source value, a required memory associated with the source value, a usage threshold of the source value, and/or the like.

The process flow may then continue at block 430, where the system may determine that the weight of the source value is above a predetermined threshold. The system may then generate an NFT associated with the matching token value, wherein the NFT includes a hash value and a connection string. The generation of the NFT is described in greater detail with respect to FIGS. 2A and 2B. In some embodiments, the system may further assign a rank to the NFT, wherein the rank is based on the weight associated with the matching source value.

The process flow may then continue to block 440, where the system may replicate the process flows of FIGS. 3 and 4 based on a real time hit ratio of each NFT. For example, in some embodiments, the system may calculate a usage score associated with each NFT, wherein the usage score is based on real-time monitoring of the operating environment. If the usage score falls below a predetermined threshold, the system may then initiate a replication of the process flows in order to generate new NFTs based on more recent user queries.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for improving the efficacy of a data element in a network, the system comprising:
    a processing device;
    a non-transitory storage device containing instructions when executed by the processing device, causes the processing device to perform the steps of:
    generate a token associated with a first data query;
    crawl into a first application server of a plurality of application servers, wherein each application server comprises application metadata;
    identify, within the application metadata of the first application server, a source value matching a token value;
    calculate a weight associated with the source value, wherein the weight associated with the source value is based on at least one of: a number of copies of the source value, a network consumption of the source value, a size associated with the source value, a number of modifications associated with the source value, and a complexity score associated with the source value;

based on determining that the calculated weight is above a predetermined threshold value, generate a non-fungible token (NFT) for the token; and
store the NFT on a distributed ledger.

2. The system of claim 1, wherein executing the instructions further causes the processing device to:
collect a plurality of data queries from a memory of the system, wherein the plurality of data queries comprises the first data query.

3. The system of claim 1, wherein the application metadata comprises at least one of: an application database, an application codebase, an application memory, and an application usage log.

4. The system of claim 1, wherein executing the instructions further causes the processing device to:
identify, using a natural language processing (NLP) engine, a match between the source value and the token value, wherein the NLP engine is configured to check for transformation logic between the source value and the token value.

5. The system of claim 1, wherein executing the instructions further causes the processing device to:
assign a rank to the token, wherein the rank is based on the weight associated with the source value.

6. The system of claim 2, wherein executing the instructions further causes the processing device to:
calculate a usage score associated with the token; and
based on the usage score, collect a second plurality of data queries from the memory of the system.

7. A computer program product for improving the efficacy of a data element in a network, the computer program product comprising a non-transitory computer-readable medium comprising code causing an apparatus to:
generate a token associated with a first data query;
crawl into a first application server of a plurality of application servers, wherein each application server comprises application metadata;
identify, within the application metadata of the first application server, a source value matching a token value;
calculate a weight associated with the source value, wherein the weight associated with the source value is based on at least one of: a number of copies of the source value, a network consumption of the source value, a size associated with the source value, a number of modifications associated with the source value, and a complexity score associated with the source value;
based on determining that the calculated weight is above a predetermined threshold value, generate a non-fungible token (NFT) for the token; and
store the NFT on a distributed ledger.

8. The computer program product of claim 7, wherein the code further causes the apparatus to:
collect a plurality of data queries from a memory of the system, wherein the plurality of data queries comprises the first data query.

9. The computer program product of claim 7, wherein application metadata comprises at least one of: an application database, an application codebase, an application memory, and an application usage log.

10. The computer program product of claim 7, wherein the code further causes the apparatus to:
identify, using a natural language processing (NLP) engine, a match between the source value and the token value, wherein the NLP engine is configured to check for transformation logic between the source value and the token value.

11. The computer program product of claim 7, wherein the code further causes the apparatus to:
assign a rank to the token, wherein the rank is based on the weight associated with the source value.

12. The computer program product of claim 8, wherein the code further causes the apparatus to:
calculate a usage score associated with the token; and
based on the usage score, collect a second plurality of data queries from the memory of the system.

13. A method for improving the efficacy of a data element in a network, the method comprising:
generating a token associated with a first data query;
crawling into a first application server of a plurality of application servers, wherein each application server comprises application metadata;
identifying, within the application metadata of the first application server, a source value matching a token value;
calculating a weight associated with the source value, wherein the weight associated with the source value is based on at least one of: a number of copies of the source value, a network consumption of the source value, a size associated with the source value, a number of modifications associated with the source value, and a complexity score associated with the source value;
based on determining that the calculated weight is above a predetermined threshold value, generating a non-fungible token (NFT) for the token; and
storing the NFT on a distributed ledger.

14. The method of claim 13, wherein the method further comprises:
collecting a plurality of data queries from a memory of the system, wherein the plurality of data queries comprises the first data query.

15. The method of claim 13, wherein the application metadata comprises at least one of: an application database, an application codebase, an application memory, and an application usage log.

16. The method of claim 13, wherein the method further comprises:
identifying, using a natural language processing (NLP) engine, a match between the source value and the token value, wherein the NLP engine is configured to check for transformation logic between the source value and the token value.

17. The method of claim 13, wherein the method further comprises:
assigning a rank to the token, wherein the rank is based on the weight associated with the source value.

* * * * *